Feb. 18, 1964   O. H. FAULKNER   3,121,556
AIRPLANE JACK ASSEMBLY WITH SPRING COMPRESSOR
Filed Nov. 2, 1961   4 Sheets-Sheet 1

INVENTOR.
OLIVER H. FAULKNER
BY *Wade Lowry*
ATTORNEY
*Arthur R. Parker*
AGENT

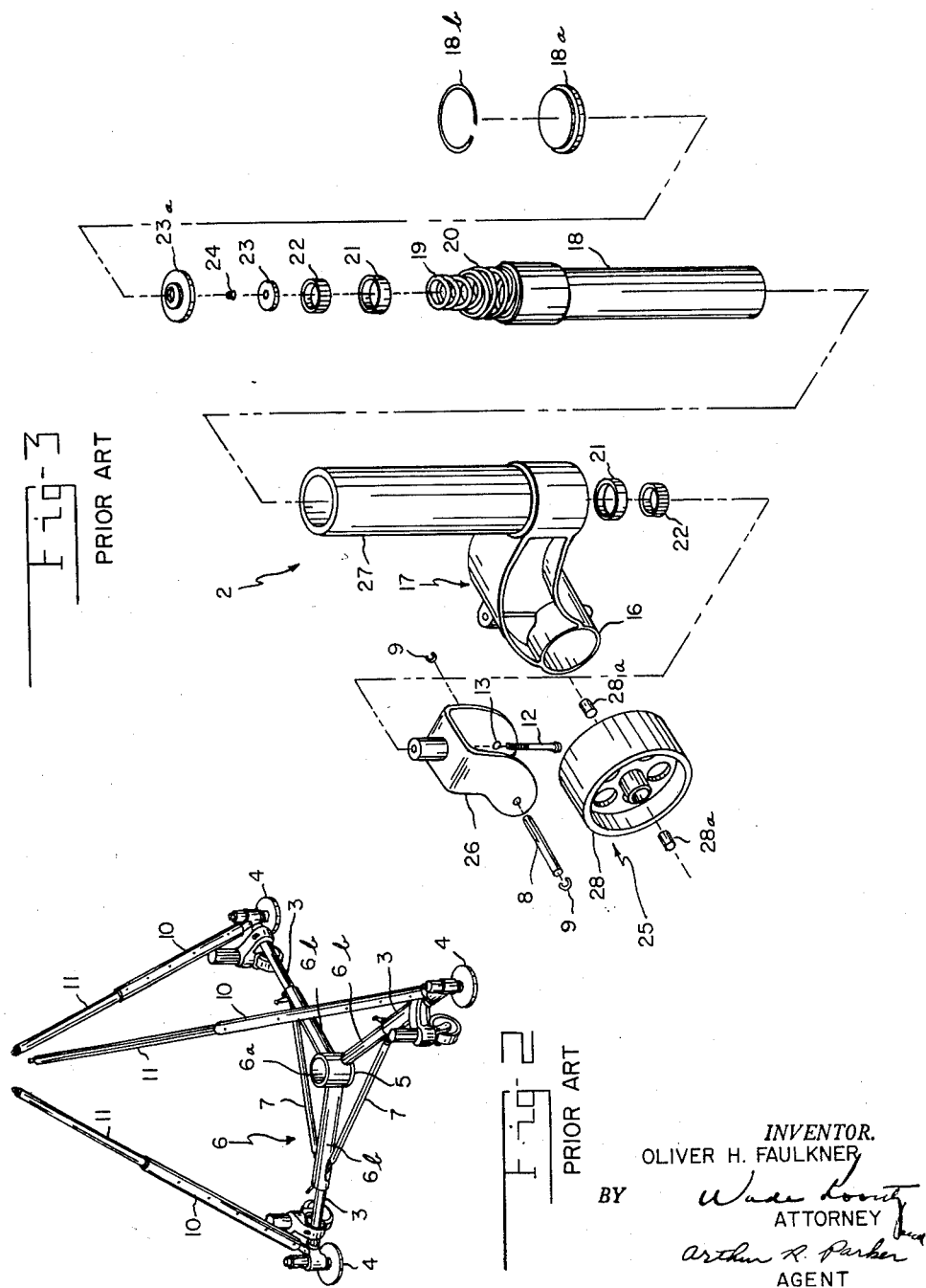

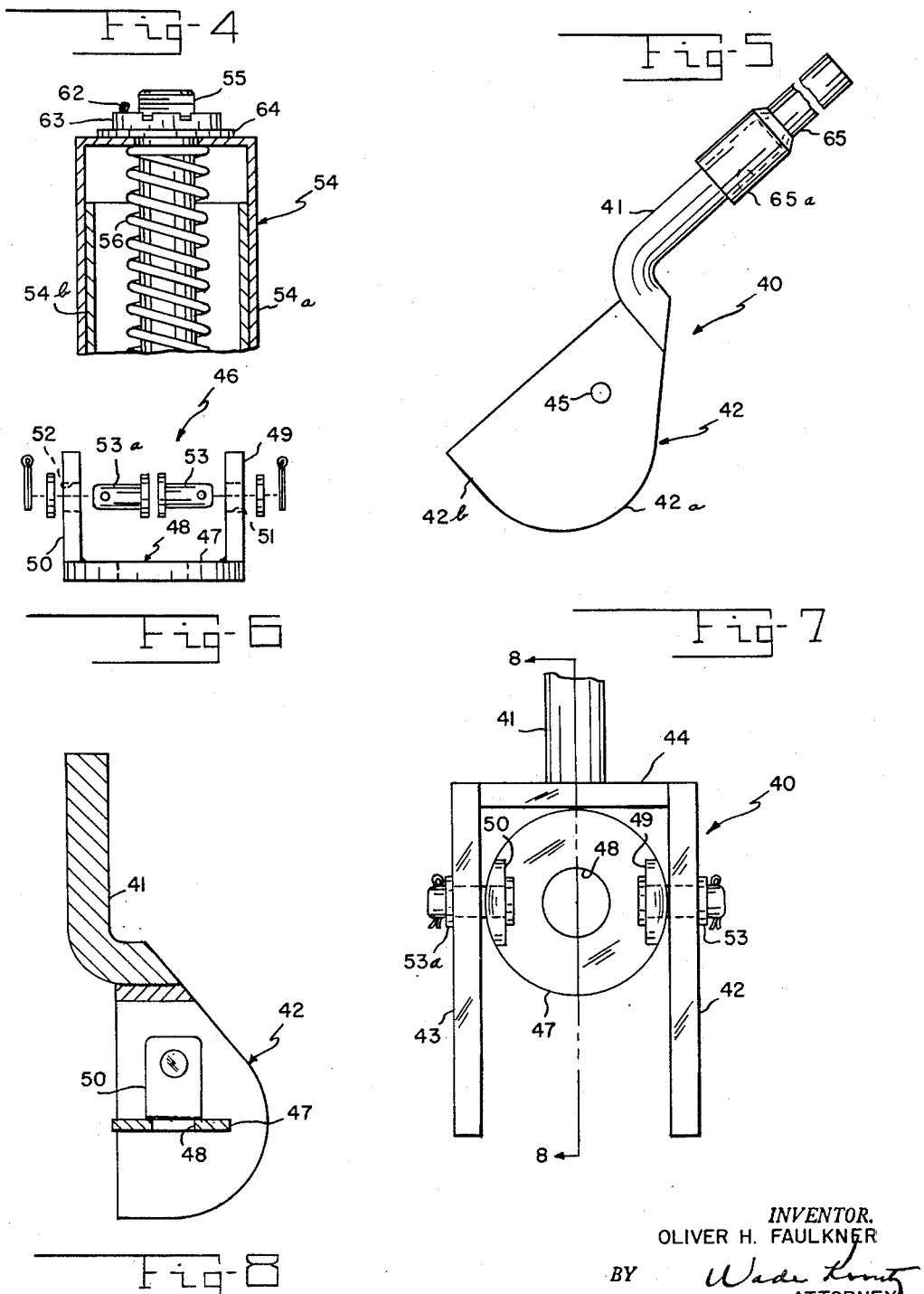

Feb. 18, 1964     O. H. FAULKNER     3,121,556
AIRPLANE JACK ASSEMBLY WITH SPRING COMPRESSOR
Filed Nov. 2, 1961     4 Sheets-Sheet 4

*INVENTOR.*
OLIVER H. FAULKNER
BY
ATTORNEY
AGENT

United States Patent Office 3,121,556
Patented Feb. 18, 1964

3,121,556
AIRPLANE JACK ASSEMBLY WITH SPRING
COMPRESSOR
Oliver H. Faulkner, 32A Choctaw Drive,
Eglin Air Force Base, Fla.
Filed Nov. 2, 1961, Ser. No. 149,794
2 Claims. (Cl. 254—2)
(Granted under Title 35, U.S. Code (1952), sec. 266)

The invention described herein may be manufactured and used by or for the United States Government for governmental purposes wtihout payment to me of any royalty thereon.

This invention relates generally to aircraft jacks and, more particularly, to a jack for raising an airplane above ground level for the purpose of changing a tire or wheel and for many other maintenance and repair operations.

The jacking of an airplane, especially the larger types, is extremely critical due to airplane flexibility, high gross weights, and numerous other precautionary measures required. At the present time, the specific types of jacks utilized for this purpose may be divided into at least three classes, namely, those utilized with airplanes having gross weights, empty, up to 265,000 lbs., up to 390,000 lbs. and up to 430,000 lbs. Each of these classes requires its own jacking procedure, the specific nature of which, however, being unimportant to the present invention.

Whatever type of jacking configuration may be involved, as for example, that used for a tire change, or for weighing an airplane, or for gear-up landings, it is essential that the load to be lifted be applied equally to all of the jack points used. Moreover, it is extremely important that the load values at each point be utilized symmetrically since any excess load on the jack pad would result in an overbalance effecting air-frame distortion. In addition, the above-referred to jacking configurations incorporate spring-loaded caster wheels, naturally, for the purpose of facilitating implacement of the jack beneath the particular jack point. In order to insure that the load applied to the jack is equally applied to all of the jack pads, some means must be developed for adjusting each of the jack pads to a ground-contacting position prior to the application of the load.

It is an object of the present invention, therefore, to utilize an airplane jack equipped with spring-loaded caster wheels and incorporating improved means for insuring that the load applied is equally distributed thereon.

An additional object of the invention resides in the utilization of an improved airplane jack incorporating unique and novel means for compressing the caster springs incorporated on each of the jack legs an equal amount.

A further object of the invention provides a spring compressor mechanism adapted for releasable attachment and for use with the caster arms of a tripod airplane jack to facilitate the mounting thereof in place beneath a desired airplane jacking location.

Other objects and advantages of the invention will become apparent from the following description, taken in connection with the accompanying drawings, in which like reference characters refer to like parts in the several figures.

FIG. 2 is a second elevational perspective view of the airplane jack of FIG. 1, illustrating additional details of the base supporting structure utilized therewith but with the hydraulic ram and cylinder mechanism removed.

FIG. 3 is an exploded view of part of the prior art airplane jack of FIGS. 1 and 2, illustrating details of one form of the bracket and caster assembly utilized therewith.

FIG. 4 is an enlarged, partially schematic and broken-away view, illustrating additional details of part of the bracket and caster assembly of FIG. 3 modified in accordance with the invention.

FIG. 5 is a side elevational view of the cam mechanism utilized with the invention with the detachable handle portion shown in assembled condition.

FIG. 6 is a front elevational view of the interconnect mechanism utilized with the modified bracket and caster assembly of FIG. 4.

FIG. 7 is a top view of the modified mechanism, illustrating the interconnect mechanism of FIG. 6 assembled to the cam mechanism of FIG. 5.

FIG. 8 is a view taken about on section 8—8 of FIG. 7, illustrating additional details of the assembled condition of the interconnect and cam mechanisms of FIG. 7 but with the cam mechanism rotated 90°.

Figure 1:
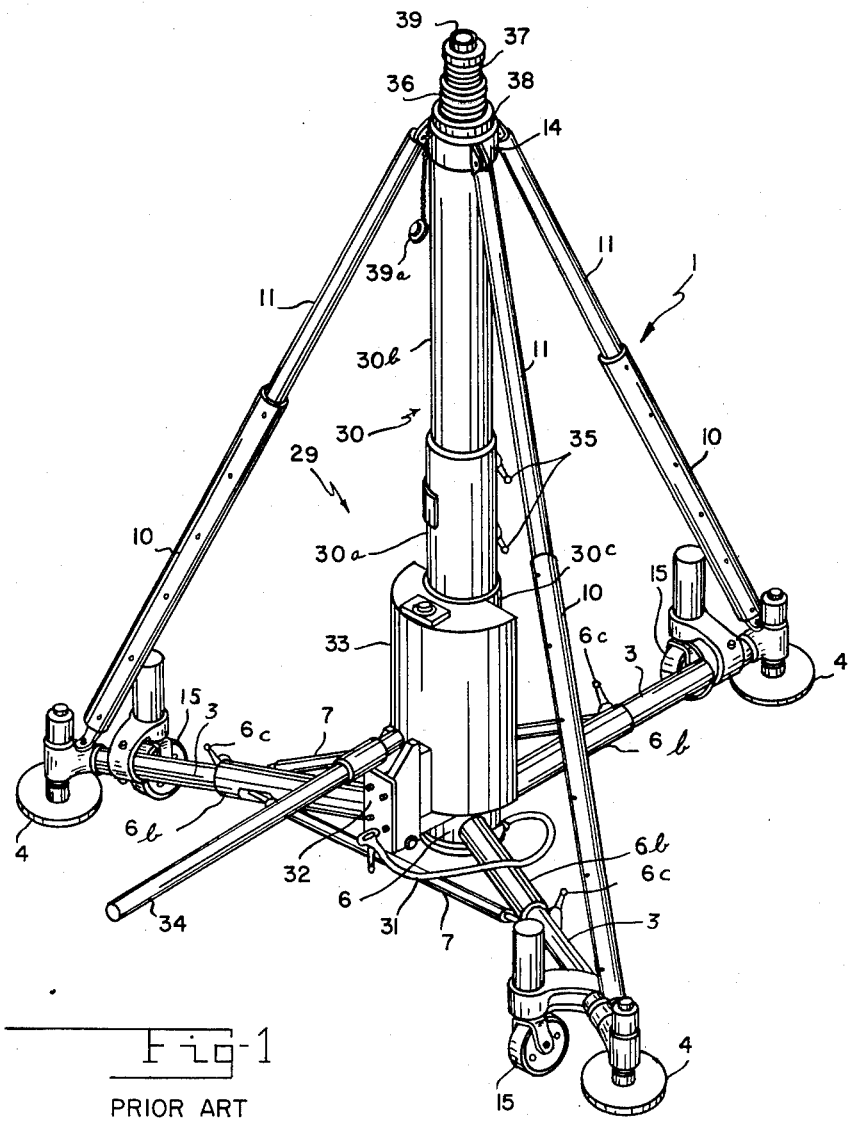
FIG. 1 is an elevational perspective view of one form of airplane jack utilizable with the invention and equipped with one form of prior art bracket and caster assembly.

With particular reference to FIG. 2 of the drawings, the main base and supporting structure for the prior art airplane jack with which the present invention may be used is indicated generally at 6 as including the base weld assembly or vertical center tube 6a and the diagonal base assembly legs 6b welded thereto. The latter are composed of three length of steel tubing welded to the base weld assembly or vertical center tube 6a. To add rigidity to the main base and supporting structure 6a, a pair of horizontal tubular braces, smaller in diameter relative to the aforesaid base assembly legs 6b, are provided as indicated at 7 and are welded at one end only to a respective base assembly leg 6b. Due to stress considerations, the other ends of horizontal braces 7 are pinned and not welded in position. It is also noted that no tubular brace as at 7 is provided on one side of the main base and supporting structure 6 in order that correct positioning of the airplane jack may be facilitated, as when working in close proximity to the landing gear. A base cap is provided as indicated at 5 to serve as a seal for the lower side of the base weld assembly or vertical center tube 6a. Said base cap 5 incorporates a plurality of drilled passages (not shown) therein to direct the flow of hydraulic fluid from a hose inlet provided in the hydraulic pump (as at 31, 32 in FIG. 1) into the pressure or lift tube mounted to the base cap 5 as will be hereinafter described in detail.

Three support tubes indicated at 3 are telescopically fitted into each of the previously-described base assembly legs 6b. Said support tubes 3 may be adjustably positioned in three alternate positions within said base assembly legs 6b in order to select the desired jack height setting. A welded fitting is provided on the outer end of each of said support tubes 3 for attachment to the bottom ends of the main tripod legs of the airplane jack each consisting of an outer diagonal brace 10 and an inner diagonal brace 11. Adjustable foot pads 4 are also attached to each of said support tubes 3 by means of the same welded fitting. Said tripod legs 10, 11 each consists of steel tubing brace elements providing rigid tripod support for the outer cylinder portion or lift tube 30a (note FIG. 1). Bolts (not shown) may be provided to secure said outer diagonal braces 10 to the previously-mentioned welded fittings provided on the outer end of each of said support tubes 3. Further, as illustrated in FIG. 1 of the drawings, bolts or other means may be utilized for securing the upper ends of said inner diagonal braces 11 to a ring fitting at 14 provided at the top of the inner cylinder portion 30b (note FIG. 1). A pair of bolt holes may be incorporated in each inner diagonal brace 11 to mate with any one of a plurality of holes provided in the corresponding outer diagonal brace 10, thus permitting adjustment of the tripod legs to a plurality of different lengths. A bracket and caster assembly, to be hereinafter described in detail, is provided on each support tube 3 as illustrated generally at 2 in FIG. 3 of the drawings.

Referring specifically to FIG. 3 of the drawings, bracket and caster assembly 2 is indicated as including a main bracket 16 adapted to be attached on the outer extremity of each support tube 3. To main bracket 16 is also affixed the bracket weld assembly 17 which bracket weld assembly 17 constitutes an outer hollow tube portion and houses a slidably positioned inner steel retaining tube portion 18 which, in turn, houses two concentric caster springs, namely, inner spring 19 and outer spring 20. The latter springs support the weight of the unloaded jack but permit the caster to depress under load. In addition, two bearing cups 21, two bearing cones 22, a washer 23 and a nut 24 are utilized to retain the caster bolt 12 and the caster and yoke assembly 25 in assembled condition in the bracket weld assembly 17. Caster and yoke assembly 25, of course, includes the yoke 26, caster arm 27, caster wheel 28 and the necessary mounting means and fittings to respectively mount caster wheel 28 to yoke 26 and, in turn, yoke 26 to the bracket weld assembly 17. These mounting means and fittings include a pintle at 8 and retainer rings at 9 for supporting caster wheel 28 in assembled condition, a grease fitting at 13 for caster bolt 12 and a pair of bearings at 28a for the pintle 8. Moreover, a washer 23a, a cup and snap ring indicated, respectively at 18a and 18b are provided for retaining the caster springs in position.

Referring to the drawings and particularly FIG. 1, the airplane wing jack utilized with the invention is indicated generally at 1 as comprising the previously-described main base and supporting structure 6 (note FIG. 2) on which is mounted the lift tube assembly indicated generally at 29 and to be described in more detail hereinafter. Said lift tube assembly 29 includes a main cylinder element indicated generally at 30, which main cylinder element 30 consists of an inner cylinder portion 30b and an outer cylinder portion 30a retained in upright position on base weld assembly or vertical center tube 6a (note FIG. 2) as by means of the cylindrical upright support indicated schematically at 30c, which cylinder portions constitute the lift tube of the airplane jack utilized with the invention. The previously-mentioned hose inlet at 31 is utilized to direct the flow of hydraulic fluid from the hydraulic hand pump indicated at 32 into the outer cylinder portion 30a of the aforesaid lift tube. A hydraulic reservoir is indicated at 33 mounted in position and a pump handle as at 34 may be utilized for manual operation of the airplane jack. A pair of locking handles may be used on lift tube 30a as at 35 for adjustably fitting inner cylinder portion 30b therein. Moreover, base assembly legs 6b are likewise each provided with a locking handle as at 6c for retaining one end of horizontal tube braces 7 in fitted position therein. A ram having both internally and externally threaded portions as indicated at 36 is slidably positioned within main cylinder 30 and, in addition, incorporates an extension screw as illustrated at 37 in FIG. 1 extending in upright relation thereover. Said ram extension screw 37 may be manually operated upwardly to a distance of 18 inches, for example, in order to engage with the load to be lifted at the particular jack point. Moreover, a lock collet as indicated at 38 is adjustably fitted to the external threads of said ram to prevent the ram from lowering in case of a hydraulic failure during operation. Finally, an adapter as at 39 is provided on top of extension screw 37 for engagement within the particular jack lift point. An adapter cover at 39a is also provided when airplane jack 1 is not in use.

Thus, the above-described airplane wing jack 1 may be easily rolled on its caster wheels as indicated at 15 in FIG. 1 into position directly beneath the selected jack point and extension screw 37 manually adjusted upwardly to an engaged position at the desired lift point. Of course, proper procedure requires that the ground surface beneath the jack be firm and level. When the load is applied, caster springs as at 19, 20 in FIG. 3 are compressed to allow the aforesaid caster wheels to depress thereunder and thereby move foot pads 4 downwardly into contact with the ground surface to support the weight of the load being lifted. If the foot pads have not been properly set the jack may shift under the weight of the aircraft and thus damage the aircraft.

Referring specifically to FIGS. 5 and 7 of the drawings, the inventive spring compressor is clearly illustrated as including the cam mechanism indicated generally at 40 which cam mechanism 40 comprises a pair of arcuately-shaped cams 42 and 43 which cams 42, 43 are retained in parallel, spaced relation to each other by means of an aft end back plate portion 44 to which back plate portion 44 is affixed a relatively short, handle portion 41. A relatively elongated, detachable handle portion 65, incorporating an elongated central recess at 65a terminating in an opening in the forward end thereof, is illustrated in assembled condition on the aforesaid relatively short handle portion 41. Within each of said cams 42, 43 is incorporated a pivot opening as at 45 (note FIG. 5) for a purpose to be described hereinafter in detail. An important feature of the spring compressor mechanism of the present invention involves the interconnect mechanism illustrated at 46 in FIG. 6 of the drawings.

The above-mentioned interconnect mechanism 46 consists of an arcuate base substantially washer shaped portion 47 (note FIG. 7) incorporating a relatively enlarged opening 48 adapted in size to accommodate the upwardly protruding end of the inventive caster bolt indicated at 55 as will be described in more detail hereinafter with specific reference to FIG. 4 of the drawings. In addition, interconnect mechanism 46 has a pair of upright, supporting leg portions 49, 50 in which leg portions 49, 50 are incorporated a pair of pivot centers indicated at 51 and 52. Pivot centers 51, 52 are respectively aligned with the pivot openings (as at 45 in FIG. 5) incorporated within cams 42 and 43 of the cam mechanism 40. A pair of clevis pins, illustrated at 53 and 53a in FIG. 6 of the drawings, are utilized for the purpose of installing or assembling the cams 42, 43 of cam mechanism 40 on the aforesaid interconnect mechanism 46 and, in this manner, assure the pivoting of said cam mechanism 40 relative to interconnect mechanism 46 for a purpose to be explained in detail hereinafter.

Figure 9:
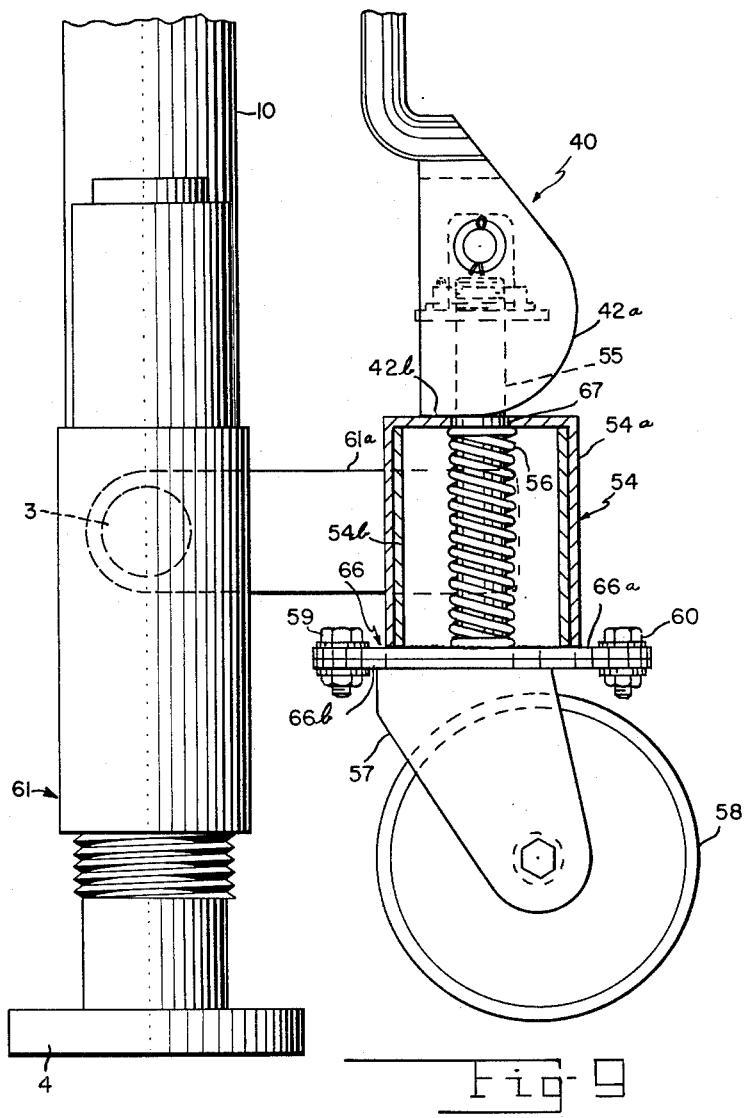
FIG. 9 is another elevational view, partially broken-away and schematic in form, further illustrating details of the assembled condition of the interconnect and cam mechanisms of FIGS. 5 and 6 but with the caster spring in compressed condition and the bracket support added thereto.

Specifically referring to FIGS. 4 and 9 of the drawings, the bracket and caster assembly, previously described relative to the form shown in FIG. 3 of the drawings, is illustrated in modified form as including a caster arm element 54 which caster arm element 54 may be in a form similar to that of the previously-described steel retaining tube 18 of FIG. 3 but somewhat modified to incorporate top and bottom end surfaces closed except for center openings made just large enough in diameter to accommodate the enlarged caster bolt as shown at 55 in FIG. 9, for example. A caster spring is shown at 56 as encircling said caster bolt 55. Said caster spring 56 is held or retained in position about the bolt 55 simply by means of the inside surfaces of caster arm 54. Caster arm element 54 consists of an outer caster arm portion 54a and an inner caster arm portion 54b fitted in telescoping relation thereon. The latter may be fixedly supported at the bottom on the double bracket element indicated generally at 66 and thereby provide slidable support for outer caster arm portion 54a which caster arm portion 54a incorporates the central opening at 67 which central opening 67 is adapted to accommodate the enlarged bolt 55 in extending relation therethrough.

Thus, it is clearly seen that the form of bracket and caster assembly utilized in FIG. 3 of the drawings, as at 2, is now modified somewhat to enable accommodation of the spring compressor mechanism of the invention. More specifically, the caster bolt 12 of FIG. 3 is enlarged both in diameter and length into the enlarged bolt 55 of FIGS. 4 and 9 and the dual caster springs 19 and 20 of FIG. 3 have been reduced to the single caster spring 56 of FIGS. 4 and 9. Further, as hereinbefore indicated, enlarged bolt 55 is made long enough to include an upwardly extending portion protruding from the previously-described center opening 67 in caster arm 54. The outer caster arm portion 54a is, of course, slidably mounted relative to caster bolt 55 and is normally held in its upper position under action of caster spring 56. Finally, a yoke as at 57 for supporting the caster wheel at 58 is rotatably supported to the bottom of caster bolt 55 in any desired manner and is further supported in position by means of the double bracket 66. The bolts at 59 and 60 are utilized to maintain upper bracket portion 66a, utilized for rigidly supporting inner caster arm portion 54b thereon, in rigid support to lower bracket portion 66b. Said bracket portions 66a, 66b, of course, incorporate central openings (not shown) therein to accommodate the rotatable attachment of yoke 57 to the bolt 55 to thereby permit normal rotatable movement of said caster wheel 58. Attached to outer caster arm portion 54a as by means of interconnecting element 61a is the support 3 connected to foot pad support 61.

To provide means for accommodating the spring compressor mechanism of the invention in connected relation to the previously-described caster and yoke assembly (as well as providing for rotatable movement of caster bolt 55), a washer is provided at 64 (note FIG. 4) which washer 64 encircles the upper, threaded portion of bolt 55. In addition, a nut at 63 and cotter pin at 62 are provided, as shown in FIG. 4 to normally retain the aforesaid bolt 55 in assembled condition. It is then only necessary to install interconnect mechanism 46 to bolt 55 as hereinafter described. Thus, washer 64, nut 63, and cotter pin 62 are removed and interconnect mechanism 46 installed on the upper end portion of bolt 55 (note FIGS. 4 and 9). The former are then replaced in reversed order to thereby retain the connected relation of interconnect mechanism 46 in rigid contact with caster arm 54. Next, cam mechanism 40 is installed or assembled to the aforesaid interconnect mechanism 46 by means of the pair of clevis pins as at 53, 53a and as previously described. Detachable handle portion 65 may then be attached to relatively short handle portion 41, as illustrated in FIG. 5, and then utilized to pivot dual cams 42 and 43 about a horizontal axis through the previously-described pivot openings and centers, respectively, incorporated in cams 42, 43 and interconnect mechanism 46 (note FIGS. 5 and 6) to a vertical, upright position as clearly shown in FIGS. 8 and 9. This latter movement about a horizontal axis results in engagement of the lower arcuate surface as indicated at 42a, for example, in FIGS. 5 and 9 engaging the upper surface of outer caster arm portion 54a to slidably move the same in a downward direction relative to fixedly mounted inner caster arm portion 54b to effect compression of the caster spring 56 about bolt 55. The above-described camming action of cams 42, 43 effect seating of the previously-described foot pads 4 of the ground surface which are then in correct position to support the load to be lifted during operation of airplane jack 1. Said daul cams 42, 43 are automatically retained in the vertical position of FIG. 9 by virtue of the straight cam portion thereof as indicated, for example, at 42b in FIGS. 5 and 9 until its handle portions 41, 65 are manually returned to their original, released position.

Thus, a new and unique device has been developed facilitating the use of airplane jacks whereby compression of the jack tripod casters to a uniform depth is effected to insure that the weight of the aircraft is equally distributed on all tripod legs before operation of the jack occurs. Moreover, by assuring that all tripod foot pads are initially placed in contact with the ground surface and directly beneath the selected jacking point, prior to the application of any load thereon, greater stability and therefore greater safety in the subsequent jacking operation results. Additionally, the spring compressor of the present invention is of unique simplicity and its design facilitates relatively rapid and easy assembly or attachment to, and disassembly from, the airplane jack (should maintenance be required, for example) but it may be retained in continual attachment to the airplane jack so long as desired without any interference with the all-around swivelling operation of the casters.

I claim:

1. In an airplane jack having a base assembly a main vertically disposed, upright center support element, horizontally disposed base assembly legs each attached to said center support element, a support tube fitted into each of said base assembly legs and extending outwardly thereof as a prolongation thereof, a caster wheel and supporting adjustable foot pad positioned on each of said support tubes, a vertically disposed lift tube element positioned in upright, sealed relation on said center support element in fluid communicating relation therewith at the lower end thereof and incorporating a ring fitting on the upper end thereof, an elongated, vertically disposed ram element slidably positioned within said lift tube and terminating in an upper, externally threaded end portion extending through an opening in the upper end of said lift tube, a locking collet in threaded engagement with the upper threaded end portion of said ram element, a vertically disposed extension screw element adjustably positioned on the upper end of said ram element and incorporating an adapter element for fitting engagement within a selected jacking point of the airplane to be elevated, and tripod-supporting legs positioned between said support tubes and said ring fitting, an improved bracket and caster assembly supporting said caster wheels, said bracket and caster assembly comprising a main bracket portion adapted for mounting on each of said support tubes, a caster arm and caster wheel affixed to said main bracket portion, yoke means rotatably mounting said caster wheel to said caster arm, relatively enlarged caster bolt means affixed to said yoke means and extending vertically upwardly to an upper externally threaded, protruding end portion through an opening in said caster arm and caster spring means retained in surrounding relation to said caster bolt within said caster arm, releasable means affixing the upper end of said caster bolt to the upper surface of said caster arm, and spring compressor means affixed to the upper end of said caster bolt and retained in position thereon by said releasable means, said spring compressor means comprising interconnect means affixed to said caster bolt in contact with the upper surface of said caster arm and manually operative cam means rotatably positioned on said interconnect means and operable between lowered and raised positions to raise said caster bolt relative to said caster arm to compress said caster spring to thereby lower said foot pads to their ground surface-contacting position.

2. In an airplane jack as in claim 1 wherein said caster arm includes an inner arm portion affixed to said yoke means and an outer arm portion slidably mounted thereon, said spring means being located between said inner arm portion and said outer arm portion, said interconnect means including a base washer member normally positively retained in contact with the upper surface of said outer arm portion by means of a caster bolt nut held in position and engaged with the externally threaded, protruding upper end portion of said caster bolt, a pair of supporting leg members on said base washer member and a pair of clevis pins for supporting said cam means on said supporting leg members, said cam means having a first portion spaced from said clevis pins a greater distance than a second portion thereof whereby movement of said cam surface from said second portion to said first portion raises said caster bolt to compress said spring to thereby lower said foot pads to their ground surface-contacting position.

References Cited in the file of this patent

UNITED STATES PATENTS

| | | |
|---|---|---|
| 654,776 | Barber | July 31, 1900 |
| 1,156,287 | Harris | Oct. 12, 1915 |
| 2,214,440 | Rothery | Sept. 10, 1940 |
| 2,240,724 | Stoehr | May 6, 1941 |
| 2,341,542 | Grime | Feb. 15, 1944 |
| 2,534,575 | Conley et al. | Dec. 19, 1950 |
| 2,540,578 | Hall et al. | Feb. 6, 1951 |
| 2,627,081 | Slopa | Feb. 3, 1953 |
| 2,735,130 | Unsworth | Feb. 21, 1956 |
| 2,819,873 | Pearne | Jan. 14, 1958 |

FOREIGN PATENTS

| | | |
|---|---|---|
| 1,128,140 | France | Aug. 20, 1956 |